US005582785A

United States Patent [19]
Yao et al.

[11] Patent Number: 5,582,785
[45] Date of Patent: Dec. 10, 1996

[54] METHOD FOR PREPARING COMPOSITE OXIDE HAVING OXYGEN ABSORBING AND DESORBING CAPABILITY

[75] Inventors: Shinya Yao, Osaka-fu; Hideo Yokoi; Tadatoshi Murota, both of Hyogo-ken; Kazuhiro Yamamoto; Shigeru Aozasa, both of Hyogo-ken, all of Japan

[73] Assignee: Santoku Metal Industry Co., Ltd., Hyogo-ken, Japan

[21] Appl. No.: 537,636

[22] Filed: Oct. 2, 1995

Related U.S. Application Data

[63] Continuation-in-part of Ser. No. 263,608, Jun. 20, 1994, Pat. No. 5,478,543.

[30] Foreign Application Priority Data

Jun. 21, 1993 [JP] Japan ................................ 5-149358
Oct. 5, 1994 [JP] Japan ................................ 6-241662

[51] Int. Cl.$^6$ ........................... C04B 37/00; C01F 17/00; C01B 13/00
[52] U.S. Cl. ............................ 264/60; 264/66; 264/118; 423/263; 423/579; 502/304
[58] Field of Search ........................... 264/60, 66, 118; 423/263, 579; 502/304

[56] References Cited

U.S. PATENT DOCUMENTS

| 5,019,366 | 5/1991 | Sakai ................................ 423/579 |
| 5,292,496 | 3/1994 | Nagashima et al. .................... 502/303 |
| 5,306,673 | 4/1994 | Hermansson et al. ................... 264/60 |

FOREIGN PATENT DOCUMENTS

| 103026 | 6/1985 | Japan ................................ 423/263 |
| 166222 | 8/1985 | Japan ................................ 423/263 |
| 23213  | 1/1991 | Japan ................................ 423/263 |

*Primary Examiner*—Wayne Langel
*Attorney, Agent, or Firm*—Darby & Darby, P.C.

[57] ABSTRACT

A method for preparing a composite oxide having oxygen absorbing and desorbing capability involves the steps of: providing a starting composite oxide comprising cerium oxide, zirconium oxide, and hafnium oxide; subjecting the starting composite oxide to heating-deoxidation to give a deoxidized composite oxide; and subjecting the deoxidized composite oxide to heating-oxidation.

21 Claims, 6 Drawing Sheets

X-ray Diffraction Pattern and Calculated Pattern of φ' Phase

X-ray Diffraction Pattern and Calculated Pattern of $\phi$ Phase

FIG.5

METHOD FOR PREPARING COMPOSITE OXIDE HAVING OXYGEN ABSORBING AND DESORBING CAPABILITY

CROSS-REFERENCE TO RELATED APPLICATION

This application is a continuation-in-part application of application Ser. No. 08/263,608 filed Jun. 20, 1994, U.S. Pat. No. 5,478,543.

BACKGROUND OF THE INVENTION

The present invention relates to a method preparing a composite oxide having especially excellent oxygen absorbing and desorbing capability which is utilizable for a catalyst for purifying exhaust gases and for functional ceramics.

Cerium oxide has hitherto been employed in large quantities as catalysts for purifying exhaust gas and as ceramics. For example, in the field of catalysts, cerium oxide is used for enhancing the purification rate exhaust gas components such as hydrocarbons, carbon monoxide and NOx, taking advantage of its characteristic properties of absorbing oxygen, in an oxidizing atmosphere and desorbing oxygen in a reducing atmosphere. In the field of ceramics, cerium oxide is used in the form of compounds or mixtures with other elements as electrically conductive ceramics, such as solid electrolytes, taking advantage of its characteristic properties mentioned above. Such cerium oxide heretofore known is usually prepared, for example by adding oxalic acid or ammonium bicarbonate to a solution of nitrate or chloride of cerium, filtering and washing the resultant precipitate, followed by drying and calcining.

However, the conventional composite oxide predominantly composed of cerium oxide prepared according to the above method, though it exhibits oxygen absorbing and desorbing capability, has a drawback in that it is incapable of sufficiently absorbing and desorbing oxygen at 400° to 700° C., and is deteriorated in performance after heating to a higher temperature.

Up to now, a cerium-zirconium composite oxide having high oxygen absorbing and desorbing capability is known and disclosed in Japanese Laid-open Patent Publication No. 5-105428 (1993), but development of a composite oxide exhibiting even more excellent oxygen absorbing and desorbing capability has still been desired.

SUMMARY OF THE INVENTION

It is therefore an object of the present invention to provide a method for easily preparing a composite oxide containing cerium oxide, zirconium oxide, and hafnium oxide which exhibits excellent oxygen absorbing and desorbing capability.

The above and other objects of the present invention will become apparent from the following description.

According to the present invention, there is provided a method for preparing a composite oxide having oxygen absorbing and desorbing capability comprising the steps of: providing a starting composite oxide comprising cerium oxide, zirconium oxide, and hafnium oxide; subjecting said starting composite oxide to heating-oxidation to give a deoxidized composite oxide; and subjecting said deoxidized composite oxide to heating-oxidation.

PREFERRED EMBODIMENT OF THE INVENTION

The present invention will now be explained in more detail hereinbelow.

In the present method, the indispensable constructions is to effect heating-deoxidation and heating-oxidation to a composite oxide containing cerium oxide, zirconium oxide, and hafnium oxide as indispensable components (referred to hereinafter as composite oxide A).

In the above composite oxide A, the preferable proportion of the indispensable components is 4.99–98.99% by weight of cerium oxide, 1–95% by weight of zirconium oxide, and 0.01–20% by weight of hafnium oxide. If the proportion of each component is outside the above-mentioned rage, the composite oxide will not be able to display sufficient oxygen absorbing and desorbing capability, thus being not preferred. Further, the composite oxide A may contain, in addition to the above indispensable components, an additional metal oxide or oxides such as titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, and mixtures thereof. Preferably, the proportion of the additional metal oxide is 10% by weight or less based on the total weight of the composite oxide A.

For preparation of the above composite oxide A, a solution containing cerium ion, zirconium ion, hafnium ion, and if necessary, additional metal ions for forming the aforementioned additional metal oxides, are mixed with an aqueous solution of ammonia, ammonium bicarbonate, or oxalic acid to prepare a composite salt precipitate containing at least cerium, zirconium, and hafnium. In this case, the solution containing cerium ion, zirconium ion, and hafnium ion may be prepared, for example, by mixing together an aqueous solution of cerium nitrate and an aqueous solution of zirconium nitrate and hafnium nitrate, or by mixing together an aqueous solution of cerium nitrate, an aqueous solution of zirconium nitrate, and an aqueous solution of hafnium nitrate. Furthermore, in this case, the above aqueous solutions may optionally be mixed with a solution containing titanium ion, tungsten ion, nickel ion, copper ion, iron ion, aluminum ion, silicon ion, beryllium ion, magnesium ion, calcium ion, strontium ion, barium ion, rare earth metal ion other than cerium ion, or mixtures thereof as needed.

The concentration of the solution containing cerium ion, zirconium ion, and hafnium ion is within a range preferably of 30 to 200 g/liter, and more preferably of 50 to 100 g/liter in terms of the composite oxide containing above ions. The mixing ratio of the cerium ion, zirconium ion, hafnium ion, and the additional metal ions optionally admixed therewith is 4.99–98.99:1–95:0.01–20:0–10 in terms of weight ratio of oxides of the respective ions.

The concentration of the aqueous solution of ammonia to be mixed with the solution containing cerium ion, zirconium ion, and hafnium ion is preferably 1–2N and more preferably 1–1.5N. The concentration of the aqueous solution of ammonium bicarbonate to be mixed with the solution containing cerium ion, zirconium ion, and hafnium ion is preferably 50 to 200 g/litter and more preferably 100 to 150 g/liter. The concentration of the aqueous solution of oxalic acid to be mixed with the solution containing cerium ion, zirconium ion, and hafnium ion is preferably 50 to 100 g/liter and more preferably 50 to 60 g/liter. The mixing ratio of the solution containing cerium ion, zirconium ion, and hafnium ion to the aqueous solution of ammonia, ammonium bicarbonate, or oxalic acid is preferably 1:1–1:10 by weight ratio. The composite salt precipitate obtained in this case may, for example be a composite hydroxide or a composite carbonate.

Composite oxide A may be produced by calcining the resultant composite salt precipitate at 300° C. or higher, preferably at 300° to 1000° for 1 to 10 hours. The composite salt precipitate may also be hydrothermally processed prior to the calcining step. The hydrothermal processing may usually be carried out using an ordinary autoclave or the like device. The temperature and the processing time for the hydrothermal processing are preferably 100° to 135° C. and 0.5 to 1 hour, respectively.

The composite oxide A may also be obtained by the following method. Specifically, for example, cerium oxide, zirconium oxide, and hafnium oxide, or otherwise. cerinm oxide and zirconium oxide containing hafnium oxide, and optionally the additional metal oxide are weighed to have a proportion of 4.99–98.99 by weight of cerium oxide, 1–95 by weight of zirconium oxide, 0.01–20 by weight of hafnium oxide, and 0–10 by weight of the additional metal oxide, and are mixed together uniformly. The mixing is effected preferably by an ordinary ball mill and the like device. The uniformly mixed oxides are then molded into pellets in a compression molding device under a pressure of preferably 200 to 1000 kg/cm$^2$, and the resultant pellets are sintered under heating at 700° to 1500° C. for 1 to 10 hours. The sintered body is then taken out and crushed by a crusher, such as a ball mill, to have a particle size preferably of 1.0 to 100 µm to give the composite oxide A.

In the present method, the composite oxide A is subsequently subjected to heating-deoxidation. It is preferred that, prior to the heating-deoxidation, impurities deposited on the composite oxide A is removed. The impurities may be removed from the composite oxide A, for example, by charging the composite oxide A in a vacuum heating furnace, introducing an oxygen gas or the like into the furnace after evacuating the inside of the furnace to vacuum, and maintaining the composite oxide therein preferably at 200° to 1000° for 0.5 to 10 hours.

The heating-deoxidation may preferably be carried out by charging the composite oxide A in a vacuum heating furnace, introducing a reducing gas, such as hydrogen or carbon monoxide into the furnace after evacuating the inside of the furnace to vacuum, and subsequently heating the composite oxide A preferably at 600° to 1000° for 0.5 to 10 hours under the reducing gas atmosphere. In this case, the heating may be carried out in a reducing gas stream as needed. The reducing gas employed may be diluted with an inert gas. In this case, the concentration of the reducing gas diluted with the inert gas is preferably not less than 1% by volume. Alternatively, the heating-deoxidation may be carried out, for example, by admixing a reducing agent such as carbon powders to the composite oxide A, and subsequently heating the resultant mixture preferably at 800° to 1300° C. for 1 to 10 hours. The mixing amount of the reducing agent is preferably 1 to 1.5 equivalent of the amount of cerium in the composite oxide A.

After the heating-deoxidation, heating-oxidation is carried out for producing the composite oxide having desired excellent oxygen absorbing and desorbing capability according to the present invention.

The heating-oxidation may be carried out by, after the heating-deoxidation, evacuating again the inside of the Furnace to vacuum for removing any residual reducing gas introducing an oxidizing gas, such as air or an oxygen gas into the furnace, and heating the composite oxide in an atmosphere of the oxidizing gas at a temperature of 600° to 850° C. for 0.5 to 10 hours. In this case, the heating may be carried out in a oxidizing gas stream as needed.

The above heating-deoxidation and the heating-oxidation may be repeated two or three times.

Figure 3A:
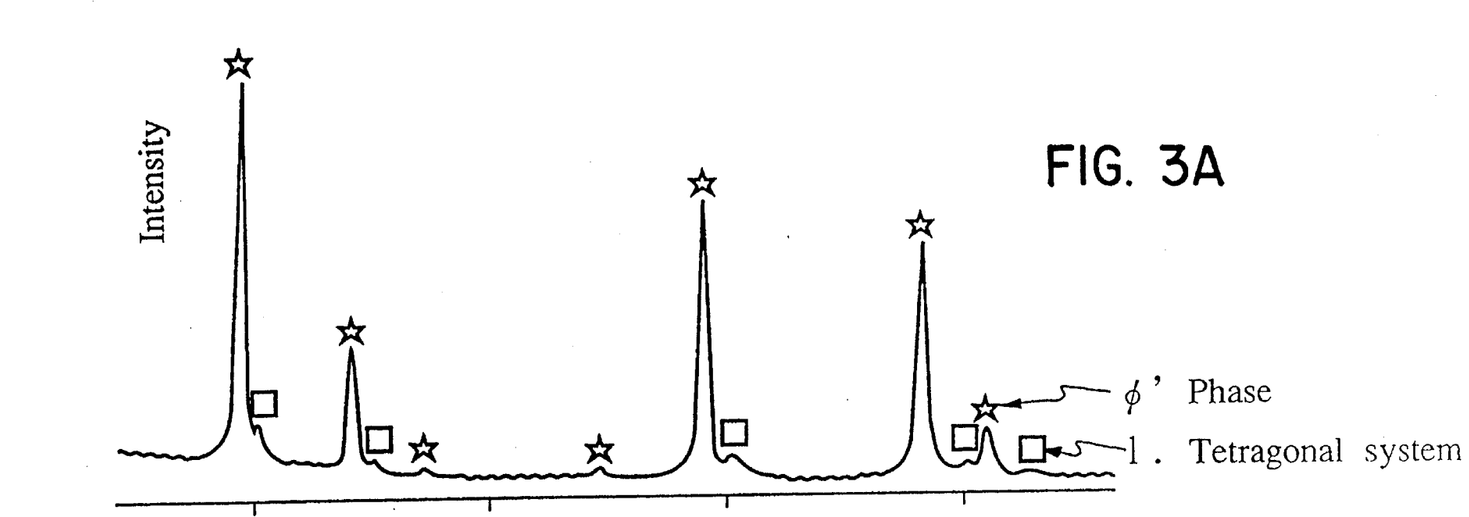
FIG. 3 is a graph showing an X-ray diffraction pattern of the composite oxide synthesized in Example 6 and a calculated pattern of the $\phi'$ phase.
Figure 3B:
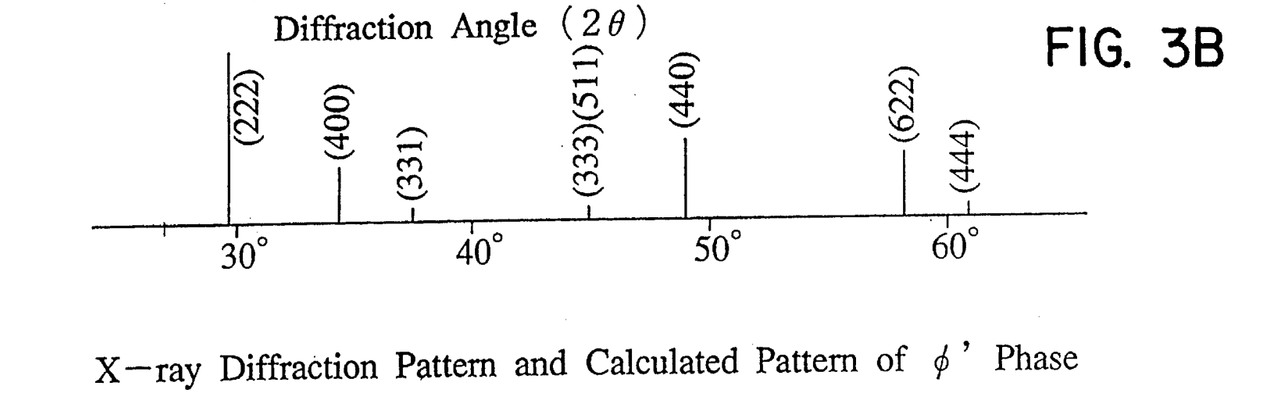

The composite oxide obtained by the present method exhibits oxygen absorbing and desorbing capability of not less than 100 µmol/g, preferably in a range of from 100 µmol/g to 1200 µmol/g, and more preferably 1.50 µmol/g to 1200 µmol/g at a temperature range of 400° to 700° C. Such oxygen absorbing and desorbing capability results from changes in valency of cerium in the composite oxide from 4 at the time of fabrication to 3 upon heating under deoxidation conditions, e.g. in a hydrogen stream. The zirconium and hafnium components contained in the composite oxide promote the oxygen absorbing and desorbing capability and the valency of both components is constant at 4, respectively. Among the composite oxides obtained by the present method, a composite oxide having $\phi'$ phase, which is a never-reported, novel crystal structure, is occasionally included. This $\phi'$ phase is comprised of 8 units of the $CaF_2$-related structure and has twice as much lattice parameter as a crystal structure not having the $\phi'$ phase. For example, a lattice parameter of $ZrO_2$—$CeO_2$ having no $\phi'$ phase is 0.51–0.53 nm, whereas that of $ZrO_2$—$CeO_2$ having $\phi'$ phase is 1.02–1.06 nm. The $\phi'$ phase is a crystal structure showing peaks in the (222), (400), (331), (333), (511), (440), (622), and (444) planes of the calculated diffraction pattern. The calculation of X-ray diffraction pattern is generally described in B. D. Cullity "Summary of X-Ray Diffraction, New Edition" issued from KK AGUNE and translated by Gentaro Matsumura (1983). However, in identifying this $\phi'$ phase, it may occur that the peak values of the (331), (333), and (511) planes in the X-ray diffraction pattern are small depending on the composition such that the peaks in these planes do not appear clearly in case of weak sensitivity in the X-ray diffraction pattern, without the presence of these peaks, the $\phi'$ phase can be identified by the other large peaks mentioned above. Although a tetragonal $\phi$ phase (V. Longo and D. Minichelli: J. Amer, Ceramic Soc., 56 (1973), 600.; P. Duran, M. Gonzzalez, C. Moure, J. R. Jurado and C. Pascual: J. Materials Sci., 25 (1990), 5001.) is known as an analogous phase, this $\phi$ phase is found to be different from the φ' phase as will become apparent by comparing the X-ray diffraction pattern and the calculated X-ray diffraction pattern shown in FIG. 3 with those of FIG. 4 as explained subsequently.

According to the present method, superior oxygen absorbing and desorbing capability can easily be rendered to a composite oxide containing cerium, zirconium, and hafnium compared to the conventional cerium oxide and cerium-zirconium composite oxide, by subjecting the composite oxide to heating-deoxidation and heating-oxidation. The resulting composite oxide is highly useful in the fields of catalysts and functional ceramics.

EXAMPLES OF THE INVENTION

The present invention will now be explained in more detail with reference to Examples and Comparative Examples hereinbelow, which are merely illustrative and not intended for limiting the present invention.

Example 1

97 ml of an aqueous solution of cerium nitrate prepared by dissolving high purity cerium nitrate solution (manufactured by SANTOKU METAL INDUSTRY CO., LTD. with a purity of 99.9%) in water to have a concentration of 300 g/liter in terms of cerium oxide were mixed with 55 ml of an aqueous solution of zirconium nitrate prepared by dissolving zirconium nitrate solution (manufactured by DAIICHI KIGENSO KAGAKU KOGYO CO., LTD. with a purity of 99.9%) in water to have a concentration of 25% by weight in terms of zirconium oxide and 24 ml of an aqueous solution of hafnium nitrate prepared by dissolving hafnium nitrate solution (manufactured by WAKO PURE CHEMICAL INDUSTRIES, LTD. with a purity of 97%) in water to have a concentration of 10 g/liter in terms of hafnium oxide, thereby preparing a solution containing cerium ion, zirconium, ion, and hafnium ion having the Ce:Zr:Hf weight ratio of 89.7:10:0.3 and the concentration of 50 g/liter in terms of the composite oxide. To 1 liter of the resultant solution was then added 1 liter of a separately prepared aqueous solution of ammonium bicarbonate having a concentration of 150 g/liter to give a precipitate of a composite carbonate containing cerium, zirconium, and hafnium. The resultant composite carbonate was calcined at 300° C. for 5 hours to yield 50 g of a composite oxide A containing cerium, zirconium, and hafnium.

Figure 1:
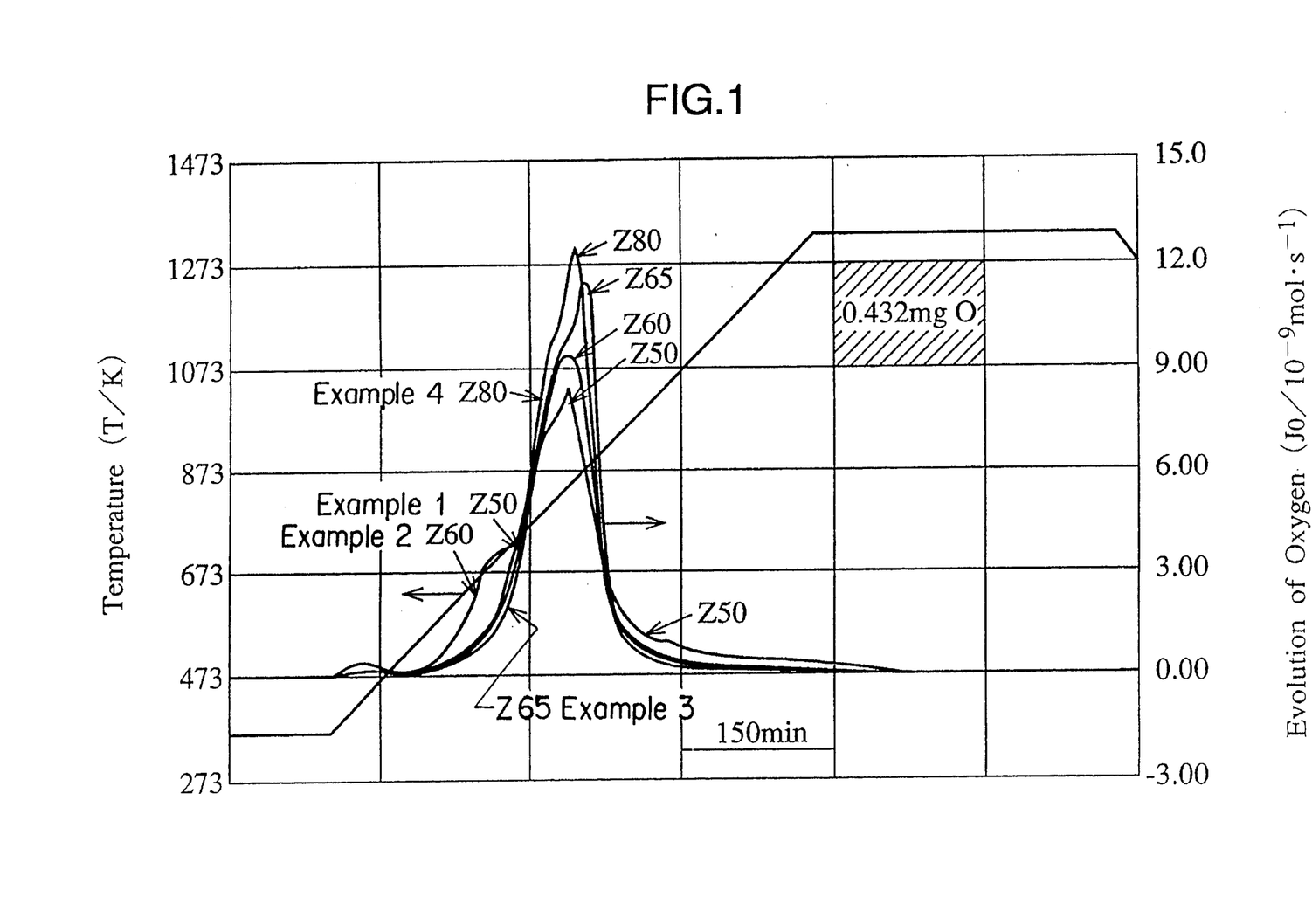
FIG. 1 is a graph showing the oxygen absorbing and desorbing capability of the composite oxides synthesized in Examples 1 to 4.
Figures 2A, 2B:
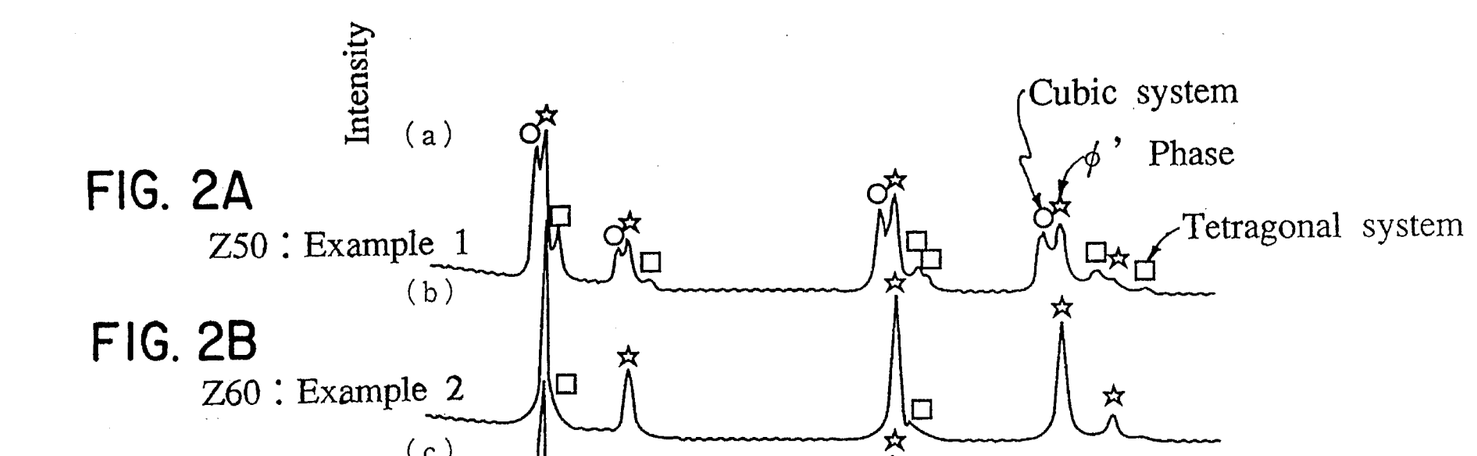
FIG. 2 is a graph showing X-ray diffraction patterns of the composite oxides synthesized in Examples 1, 2, 3, and 4, respectively.
Figures 2C, 2D:
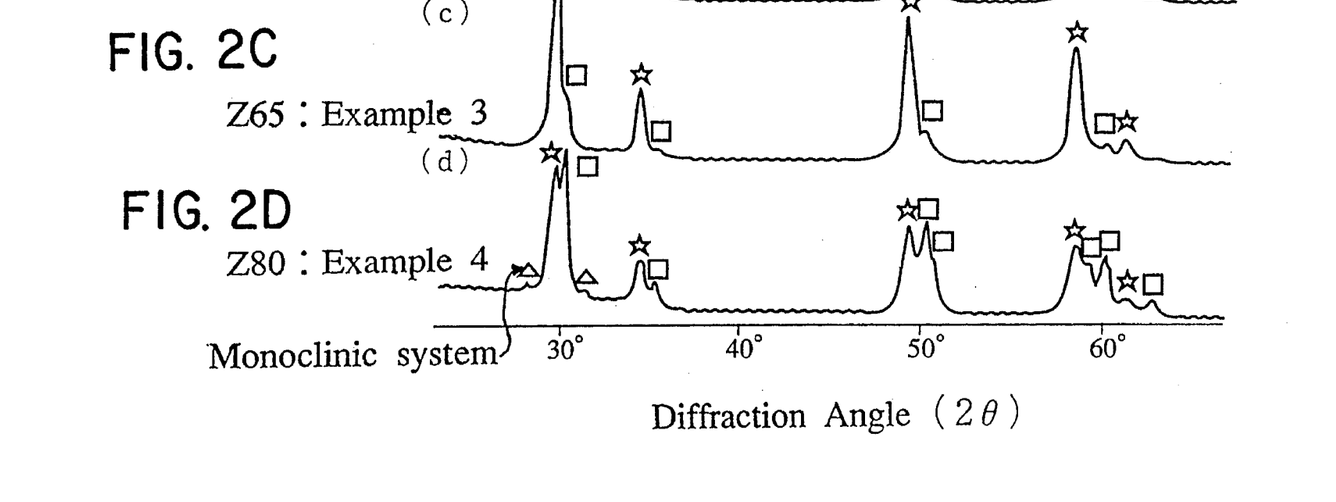

The composite oxide A was charged in a vacuum heating furnace which was then evacuated to vacuum. The composite oxide A was then heated to and maintained at 900° C. for one hour as a pure oxygen gas was introduced into the furnace for removing impurities affixed thereto. After the temperature was lowered to 100° C. the furnace was again evacuated to vacuum to remove oxygen gas. The composite oxide A was heated at 1000° C. for 5 hours as an argon gas-diluted 10% hydrogen gas was introduced into the furnace. After the temperature was lowered to 600° C. the furnace was evacuated to vacuum. The composite oxide A was then heated at 600° C. for 5 hours as the oxygen gas was introduced into the furnace for synthesizing the composite oxide. The oxygen absorbing and desorbing properties of the produced composite oxide were then measured using an electro-chemical oxygen pump type closed-system oxygen analyzer disclosed in Shinya Yao and Zensaku Kozuka, "Detection of the Phase Transitions of Praseodymium Oxide Thin Film by a Closed-System Potentiostatic Technique Employing a Solid Electrolyte", Journal of the Electro-Chemical Society of Japan, 61 No. 2, P262 (1993). The results are shogun in FIG. 1 (see Z50). The values of the absorbed and desorbed quantities of oxygen as read from FIG. 1 are shown in Table 1. Analyses of the crystal structure of the produced composite oxide with an X-ray diffraction apparatus manufactured by SHIMADZU CORP., revealed that the crystal structure had φ' phase. The results are shown in FIG. 2 (see (a), Z50). Measurements of the composition of the produced composite oxide indicated the composition of 58.16% by weight of cerium oxide, 41.35% by weight of zirconium oxide, and 0.49% by weight of hafnium oxide.

Example 2

A composite oxide was produced in the same way as Example 1 except changing the composition of the starting components so that the composition of the composite oxide was 48.10% by weight of cerium oxide, 51.30% by weight of zirconium oxide, and 0.60 % by weight of hafnium oxide. The results are shown in FIGS. 1 and 2 (see Z60 in FIG. 1 and (b) Z60 in FIG. 2) and in Table 1, as in Example 1.

Example 3

21.4 g of cerium oxide (manufactured by SANTOKU METAL INDUSTRY CO., LTD. with a purity of 99.9%) was mixed with 28.6 g of zirconium oxide containing 1.17% by weight of hafnium oxide (manufactured by SANTOKU METAL INDUSTRY CO., LTD. with a purity of zirconium oxide of 98.83% by weight) in a ball mill., and compression-molded by a compression molding device under a molding pressure of 500 kg/cm$^2$ to give pellets. The resultant pellets were then sintered in atmosphere at 1500° for 5 hours, and subsequently crushed in a ball mill to give a composite oxide A. The resultant composite oxide A was charged in a vacuum heating furnace, which was then evacuated to vacuum, as in Example 1. The composite oxide A was then heated to and maintained at 900° C. for 1 hour as a pure oxygen gas was introduced into the furnace for removing impurities affixed thereto. After the temperature was lowered to 100° C., the furnace was again evacuated to vacuum to remove oxygen gas. The composite oxide A was then heated at 1000° C. for 5 hours as an argon gas-diluted 10% hydrogen gas was introduced into the furnace. After the temperature was lowered to 600° C., the furnace was evacuated to vacuum. The composite oxide A was then heated at 600° C. for 5 hours as the oxygen gas was introduced into the furnace for synthesizing the composite oxide.

The oxygen absorbing and desorbing properties of the produced composite oxide were measured as in Example 1. The values of the absorbed and desorbed quantities of oxygen as read from FIG. 1 are shown in Table 1. Analyses of the crystal structure conducted in the same way as in Example 1, indicated the presence of φ' phase. The results are shown in FIG. 2 (see (c), Z65). Measurements of the composition of the produced composite oxide indicated the composition of 42.81% by weight of cerium oxide, 56.52% by weight of zirconium oxide, and 0.67% by weight of hafnium oxide.

Example 4

A composite oxide was produced in the same way as in Example 3 except changing the composition of the starting components so that the composition of the composite oxide was 25.79% by weight of cerium oxide, 73.35% by weight of zirconium oxide, and 0.86% by weight of hafnium oxide.

File results are shown in FIGS. 1 and 2 (see Z80 in FIG. 1 and (d), Z80 in FIG. 2) and in Table 1, as in Example 3.

Example 5

79 ml of an aqueous solution of cerium nitrate prepared in Example 1 were mixed with 68 ml of an aqueous solution containing zirconium nitrate prepared by dissolving zirconium nitrate solution containing 1.17% by weight of hafnium based on the total weight of zirconium in water to have a concentration of 25% by weight in terms of zirconium oxide and 8 ml of an aqueous solution of yttrium nitrate prepared by dissolving yttrium nitrate (manufactured by SANTOKU METAL INDUSTRY CO., LTD. with a purity of 99.9%) in water to have a concentration of 100 g/liter in terms of yttrium oxide, thereby preparing a solution containing cerium ion, zirconium ion, hafnium ion, and yttrium ion having the Ce:Zr:Hf:Y weight ratio of 49.9:47.8:0.7:1.6 and the concentration of 50 g/liter in terms of the composite oxide. Then the resultant solution was processed in the same manner as in Example 1 to obtain 50 g of composite oxide A.

The composite oxide A was charged in a vacuum heating furnace, which was then evacuated to vacuum. The composite oxide A was then heated to and maintained at 900° C. for 1 hour as a pure oxygen gas was introduced into the furnace for removing impurities affixed thereto. After the temperature was lowered to 100° C., the furnace was again evacuated to vacuum to remove oxygen gas. The composite oxide A was then heated at 900° C., for 5 hours as an argon gas-diluted 10% hydrogen gas was introduced. After the temperature was lowered to 600° C., the furnace was evacuated to vacuum. The composite oxide A was then heated at 600° C. for 5 hours as the oxygen gas was introduced into the furnace for synthesizing the composite oxide.

The oxygen absorbing and desorbing properties of the produced composite oxide was measured in the same manner as in Example 1. The results are shown in Table 1. The composition of the produced composite oxide was 47.63% by weight of cerium oxide, 50.20% by weight of zirconium oxide, 0.59% by weight of hafnium oxide, and 1.58% by weight of yttrium oxide.

Example 6

24.0 g of cerium oxide (manufactured by SANTOKU METAL INDUSTRY CO., LTD. with a purity of 99.9%) was mixed with 25.6 g of zirconium oxide containing 1.17% by weight of hafnium oxide (manufactured by SANTOKU METAL INDUSTRY CO., LTD. with a purity of zirconium oxide of 98.83% by weight) and 0.4 g of commercially available calcium oxide (purity of 99.9%) in a ball mill, and compression-molded by a compression molding device under a molding pressure of 500 kg/cm² to give pellets. The resultant pellets were then sintered in atmosphere at 1500° C. for 5 hours, and subsequently crushed in a ball mill to give a composite oxide A. The composite oxide A was charged in a vacuum heating furnace, which was then evacuated to vacuum. The composite oxide A was then heated to and maintained at 900° C. for 1 hour as a pure oxygen gas was introduced into the furnace for removing impurities affixed thereto. After the temperature was lowered to 100° C., the furnace was again evacuated to vacuum to remove oxygen gas. The composite oxide A was then heated at 1000° C. for 5 hours as an argon gas-diluted 10% hydrogen gas was introduced. After the temperature was lowered to 600° C., the furnace was evacuated to vacuum.

The composite oxide A was then heated at 600° C. for 5 hours as the oxygen gas was introduced into the furnace for synthesizing-the composite oxide.

Figure 4A:
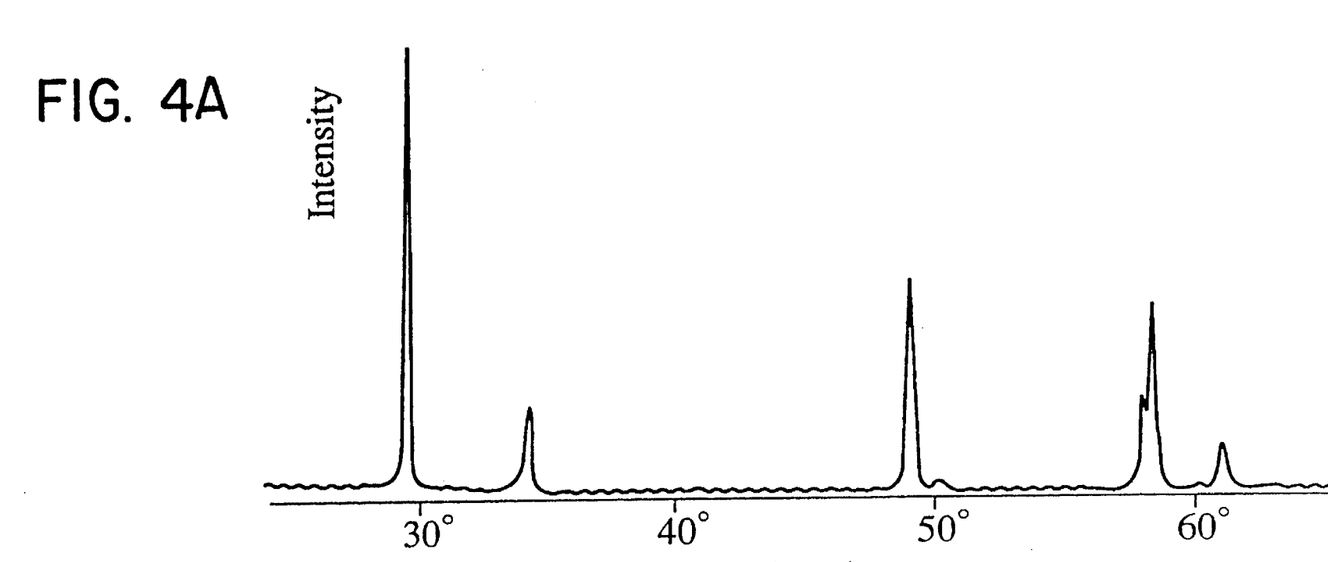
FIG. 4 is a graph showing an X-ray diffraction pattern of the composite oxide A synthesized in Example 6 and calculated pattern of the $\phi$ phase.
Figure 4B:
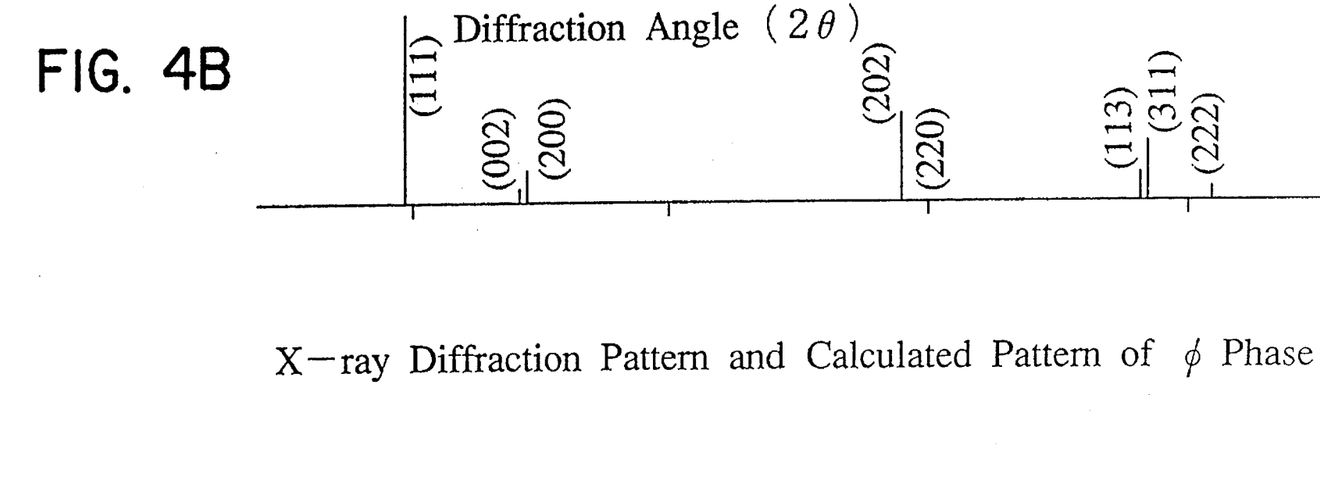

The oxygen absorbing and desorbing properties of the produced composite oxide were measured in the same way as in Example 1. Analyses of the crystal structure conducted in the same way as in Example 1 showed the presence of φ phase, without indicating the presence of φ' phase. The results are shown in FIG. 4. Comparison of FIG. 3 with FIG. 4 revealed that the φ' phase was different from the φ phase. The composition of the composite oxide was 48.02% by weight of cerium oxide, 50.60% by weight of zirconium oxide, 0.59% by weight of hafnium oxide, and 0.79% by weight of calcium oxide.

Comparative Examples 1 and 2

Figure 5:
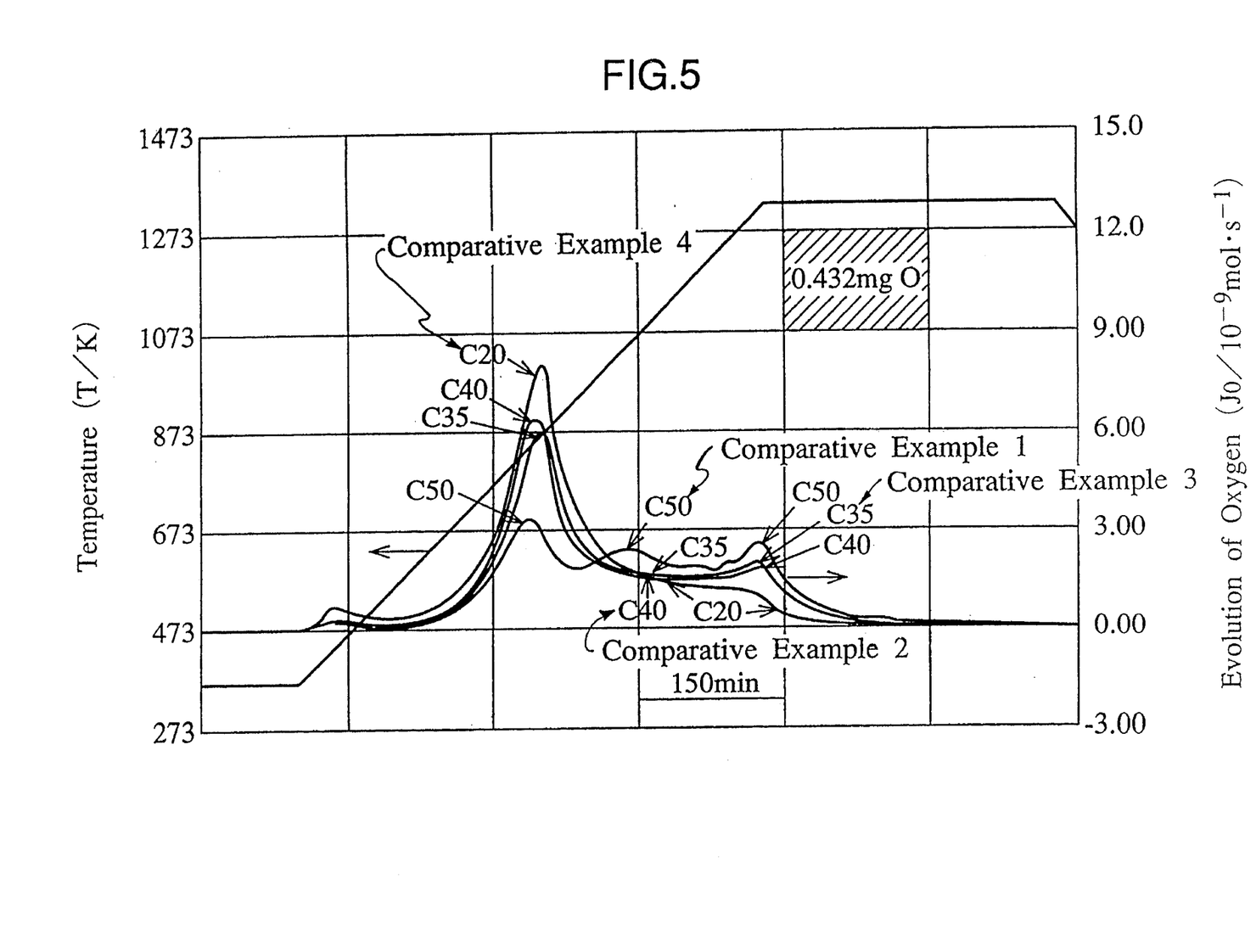
FIG. 5 is a graph showing the oxygen absorbing and desorbing capability of the composite oxides synthesized in Comparative Examples 1 to 4.
Figures 6A, 6B, 6C, 6D:
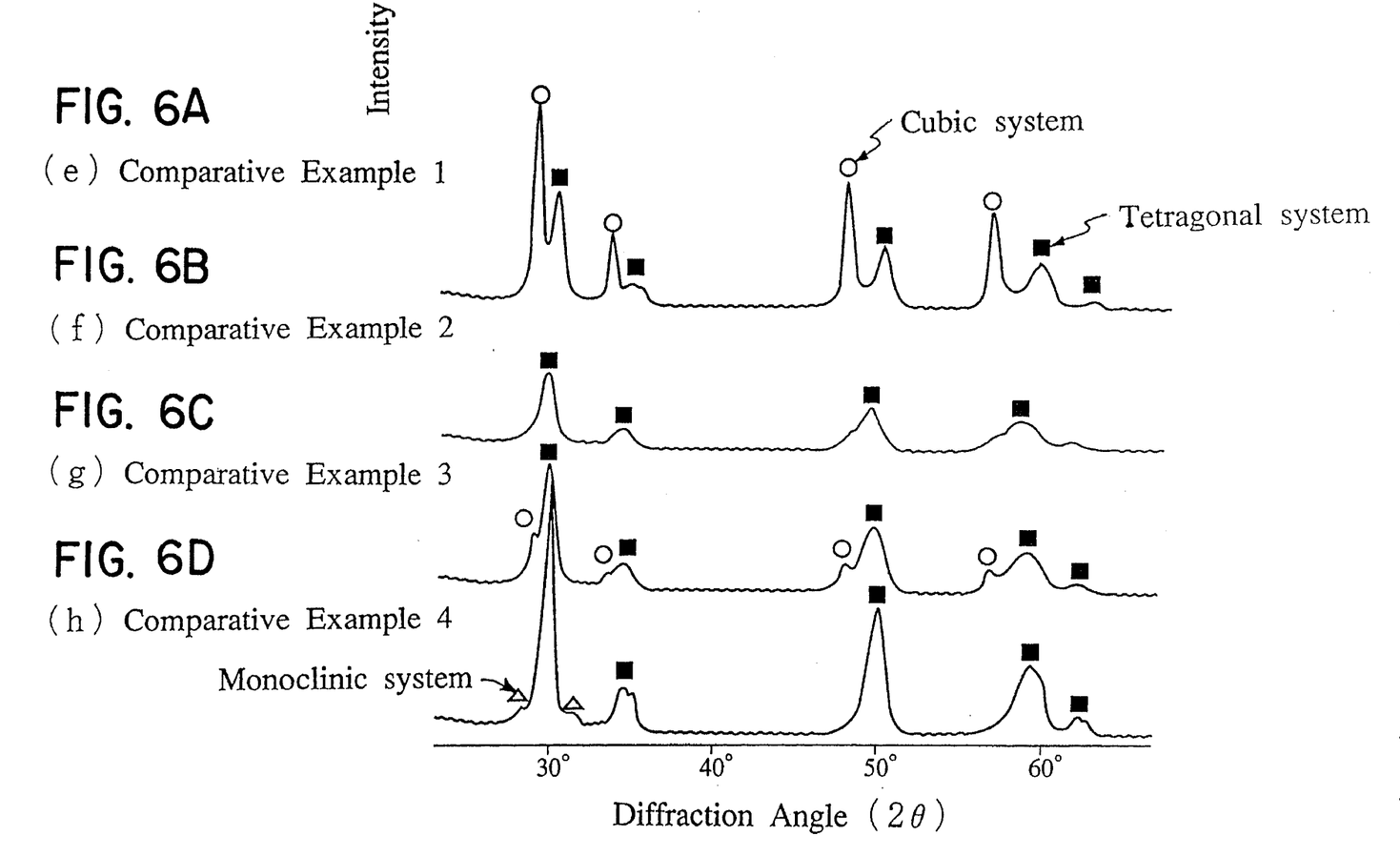
FIG. 6 is a graph showing X-ray diffraction patterns of the composite oxides synthesized in Comparative Examples 1, 2, 3, and 4, respectively.

Composite oxides were prepared in the same manner as Examples 1 and 2, respectively except that neither the heating-deoxidation nor the heating-oxidation was effected. X-ray diffraction and measurements of oxygen absorbing and desorbing properties of the produced composite oxides were measured in the same manner as in Example 1, respectively. The results are shown in FIGS. 5 and 6 (see C50 and C40 in FIG. 5 and (e) and (f) in FIG. 6), and in Table 1.

Comparative Examples 3 and 4

Composite oxides were prepared in the same manner as in Examples 3 and 4, respectively except that neither the heating-deoxidation nor the heating-oxidation was effected. The X-ray diffraction and oxygen absorbing and desorbing properties of the produced composite oxides were measured in the same manner as in Example 3, respectively. The results are shown in FIGS. 5 and 6 (see C35 and C20 in FIG., 5 and (g) and (h) in FIG. 6), and in Table 1.

TABLE 1

| | Composition (wt. % of oxide) | | | | | Oxygen absorbing and desorbing capability |
|---|---|---|---|---|---|---|
| | Ce | Zr | Hf | Ca | Y | Oxygen μmol/g |
| Example 1 | 58.16 | 41.35 | 0.49 | | | 1,112 |
| Example 2 | 48.10 | 51.30 | 0.60 | | | 1,073 |
| Example 3 | 42.81 | 56.52 | 0.67 | | | 1,009 |
| Example 4 | 25.79 | 73.35 | 0.86 | | | 638 |
| Example 5 | 47.63 | 50.20 | 0.59 | | 1.58 | 1,053 |
| Example 6 | 48.02 | 50.60 | 0.59 | 0.79 | | 1,071 |
| Comp. Ex. 1 | 58.16 | 41.35 | 0.49 | | | 463 |
| Comp. Ex. 2 | 48.10 | 51.30 | 0.60 | | | 655 |
| Comp. Ex. 3 | 42.81 | 56.52 | 0.67 | | | 516 |
| Comp. Ex. 4 | 25.79 | 73.35 | 0.86 | | | 408 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for preparing a composite oxide having oxygen absorbing and desorbing capability comprising the steps of:

providing a starting composite oxide comprising cerium oxide, zirconium oxide, and hafnium oxide;

subjecting said starting composite oxide to heating-deoxidation to give a deoxidized composite oxide; and subjecting said deoxidized composite oxide to heating-oxidation.

2. The method as claimed in claim 1, wherein said step of subjecting said staring composite oxide to heating-deoxidation comprises heating said starting composite oxide at 600°–1000° C. for 0.5–10 hours under deoxidizing atmosphere.

3. The method as claimed in claim 2, wherein said heating-deoxidation is carried out in a reducing gas stream.

4. The method as claimed in claim 1, wherein said step of subjecting said staring composite oxide to heating-deoxidation comprises the steps of admixing a reducing agent to said starting composite oxide to give a mixture, and heating said mixture at 800°–1300° C. for 1–10 hours.

5. The method as claimed in claim 4, wherein said reducing agent is admixed in an amount of 1–1.5 equivalent of the amount of cerium contained in said starting composite oxide.

6. The method as claimed in claim 1, wherein said step of subjecting said deoxidized composite oxide to heating-oxidation comprises heating said deoxidized composite oxide at 600°–850° C. for 0.5 to 10 hours under oxidizing atmosphere.

7. The method as claimed in claim 1, wherein said steps of subjecting said starting composite oxide to heating-deoxidation and subjecting said deoxidized composite oxide to heating-oxidation are repeated by turns.

8. The method as claimed in claim 1, wherein said step of providing a starting composite oxide comprising cerium oxide, zirconium oxide, and hafnium oxide comprises the steps of mixing a first solution containing cerium ion, zirconium ion, and hafnium ion with a second solution selected from the group consisting of an aqueous solution of ammonia, an aqueous solution of ammonium bicarbonate, and an aqueous solution of oxalic acid to prepare a composite salt precipitate containing cerium, zirconium, and hafnium, and calcining said precipitate at a temperature of at least 300° C.

9. The method as claimed in claim 8, wherein the first solution is obtained by mixing together an aqueous solution of cerium nitrate, an aqueous solution of zirconium nitrate, and an aqueous solution of hafnium nitrate.

10. The method as claimed claim 8, wherein the first solution is obtained by mixing together an aqueous solution of cerium nitrate and an aqueous solution of zirconium nitrate containing hafnium nitrate.

11. The method as claimed in claim 8, wherein the first solution contains an additional ion selected from the group consisting of titanium ion, tungsten ion, nickel ion, copper ion, iron ion, aluminum ion, silicon ion, beryllium ion, magnesium ion, calcium ion, strontium ion, barium ion, radium ion, rare earth metal ion other than cerium ion, and mixtures thereof.

12. The method as claimed in claim 1, wherein said step of providing a starting composite oxide comprising cerium oxide, zirconium oxide, and hafnium oxide comprises the steps of mixing uniformly cerium oxide, zirconium oxide, and hafnium oxide to give a mixture, molding said mixture to give a pellet, sintering said pellet, and pulverizing said pellet.

13. The method as claimed in claim 12, wherein said mixture was further admixed with an additional metal oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, radium oxide, rare earth metal oxide other than cerium oxide, and mixtures thereof.

14. The method as claimed in claim 12, wherein said step of sintering is carried out at 700° to 1500° C. for 1 to 10 hours.

15. The method as claimed in claim 1, wherein said starting composite oxide contains 4.99–98.99% by weight of cerium oxide, 1–95% by weight of zirconium oxide, and 0.01–20% by weight of hafnium oxide.

16. The method as claimed in claim 1, wherein said starting composite oxide contains an additional metal oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, oxide of rare earth metals other than cerium, and mixtures thereof in an amount up to 10% by weight based upon a total weight of the composite oxide.

17. The method as claimed in claim 1, wherein said composite oxide has oxygen absorbing and describing capability of at least 100 μmol/g at 400° to 700° C.

18. The method as claimed in claim 1, wherein the composite oxide has an oxygen absorbing and desorbing capability of 100 to 1200 μmol/g at 400° to 700° C.

19. The method as claimed in claim 1, wherein the composite oxide has an oxygen absorbing and desorbing capability of 150 to 1200 μmol/g at 400° to 700° C.

20. The method as claimed in claim 1, wherein the composite oxide includes φ' phase as a crystal phase.

21. The method as claimed in claim 20, wherein the φ' phase has a structure comprised of eight units of $CaF_2$-related structure and has about twice as much lattice parameter as a crystal structure not having the φ' phase.

* * * * *

UNITED STATES PATENT AND TRADEMARK OFFICE
CERTIFICATE OF CORRECTION

PATENT NO. : 5,582,785
DATED : December 10, 1996
INVENTOR(S) : Shinya YAO et al.

It is certified that error appears in the above-indentified patent and that said Letters Patent is hereby corrected as shown below:

Claim 17, Col. 10, line 38, change "describing" to --desorbing--.

Signed and Sealed this

Fifteenth Day of July, 1997

Attest:

BRUCE LEHMAN

Attesting Officer      Commissioner of Patents and Trademarks